(12) United States Patent
Bonner

(10) Patent No.: US 8,417,285 B2
(45) Date of Patent: Apr. 9, 2013

(54) MOBILITY MANAGEMENT MESSAGE ANALYSIS

(75) Inventor: Thomas W. Bonner, Smyrna, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 965 days.

(21) Appl. No.: 11/378,107

(22) Filed: Mar. 17, 2006

(65) Prior Publication Data

US 2007/0218871 A1    Sep. 20, 2007

(51) Int. Cl.
*H04M 1/00*    (2006.01)

(52) U.S. Cl. ............... 455/552.1; 455/406; 455/410; 455/439; 455/466; 455/554.1; 370/310; 370/331; 370/338; 370/349

(58) Field of Classification Search ............ 455/406, 455/410, 439, 466, 552.1, 554.1; 370/310, 370/331, 338, 349
See application file for complete search history.

(56) References Cited

U.S. PATENT DOCUMENTS

| | | | |
|---|---|---|---|
| 6,658,253 B1 * | 12/2003 | Berggren et al. | 455/444 |
| 6,711,147 B1 | 3/2004 | Barnes et al. | |
| 6,735,202 B1 | 5/2004 | Ahmed et al. | |
| 6,904,029 B2 * | 6/2005 | Fors et al. | 370/331 |
| 6,934,534 B1 | 8/2005 | Roy | |
| 6,940,844 B2 | 9/2005 | Purkayastha et al. | |
| 6,954,647 B2 | 10/2005 | Lin et al. | |
| 6,961,588 B2 | 11/2005 | Watanabe | |
| 6,980,801 B1 | 12/2005 | Soininen et al. | |
| 7,079,499 B1 * | 7/2006 | Akhtar et al. | 370/310 |
| 7,277,735 B1 * | 10/2007 | Oh et al. | 455/567 |
| 2002/0147008 A1 * | 10/2002 | Kallio | 455/426 |
| 2002/0191575 A1 * | 12/2002 | Kalavade et al. | 370/338 |
| 2003/0129991 A1 * | 7/2003 | Allison et al. | 455/456 |
| 2003/0134650 A1 * | 7/2003 | Sundar et al. | 455/465 |
| 2004/0072593 A1 * | 4/2004 | Robbins et al. | 455/560 |
| 2004/0192357 A1 * | 9/2004 | Lin et al. | 455/466 |
| 2005/0111421 A1 * | 5/2005 | Delaney et al. | 370/338 |
| 2005/0130660 A1 | 6/2005 | Park et al. | |
| 2005/0254469 A1 * | 11/2005 | Verma et al. | 370/338 |
| 2006/0004643 A1 * | 1/2006 | Stadelmann et al. | 705/34 |
| 2006/0035672 A1 | 2/2006 | Semper | |
| 2006/0111112 A1 * | 5/2006 | Maveddat | 455/439 |
| 2006/0286980 A1 * | 12/2006 | Hua | 455/435.1 |

FOREIGN PATENT DOCUMENTS

| | | | |
|---|---|---|---|
| WO | 2006001593 | | 1/2006 |
| WO | WO2006001593 | * | 1/2006 |

OTHER PUBLICATIONS

International Search Report for PCT Patent Application No. PCT/US07/64168, dated Sep. 19, 2008, 4 pages.

* cited by examiner

*Primary Examiner* — Amancio Gonzalez

(74) *Attorney, Agent, or Firm* — Turocy & Watson, LLP

(57) ABSTRACT

A system that facilitates detecting, analyzing, and selectively enabling mobility management messages in connection with providing dual mode services comprises a receiver component that receives a mobility management message from an enterprise network. An analysis component communicatively coupled to the receiver component determines a type of the mobility management message and further determines whether or not to allow a mobility management transaction corresponding to the mobility management message based at least in part upon the determined type.

25 Claims, 12 Drawing Sheets

MOBILITY MANAGEMENT MESSAGE ANALYSIS

BACKGROUND

The mobile telephone industry has been associated with tremendous growth over the last several years. For instance, in the recent past, mobile telephones were only available to those of highest economic status due to service costs and costs associated with mobile phones. Moreover, network coverage was not extensive enough to enable robust service. In particular, only areas associated with dense population were provided with extensive wireless network coverage. Still further, the mobile phones that could utilize the networks to communicate were quite bulky, causing portation of the phone over any significant distance to be difficult at best. In more detail, antennas associated with these phones could be over a foot in length, thus making it difficult to utilize the phones in automobiles or other congested areas.

In contrast, today's portable phones (and other portable devices) can be utilized as full-service computing machines. For example, many of the most recent and advanced mobile phones can be associated with word processing software, accounting software, and various other types of software. Furthermore, network coverage has expanded to cover millions, if not billions, of users. Additionally, mobile phones have decreased in both size and cost. Specifically, modern mobile phones are often small enough to slip into an individual's pocket without discomforting the individual. Furthermore, many mobile network service providers offer phones at extremely low cost to customers who contract for service with such providers.

Advances in technology relating to mobile devices in general, and mobile phones in particular, continue to occur. For example, recently mobile telephones have been designed to communicate over disparate networks and/or between licensed and unlicensed spectra. In more detail, a dual mode handset can connect to a cellular network to effectuate communications between a user of the mobile phone and another phone device, and can further connect via WiFi to a wireless local access network (LAN) and thereafter utilize the Voice over Internet Protocol (VoIP) to effectuate communication between users. Use of VoIP is often desirable to users as it is associated with less cost than employing a cellular network. In fact, some users may consider phone calls made over VoIP (or other IP-based network) completely free, despite the fact that they pay for Internet service.

Implementation of this dual mode service is due at least in part to the Third Generation Partnership Project (3GPP), which have created specifications that define a mechinism that provides signal interity for session initial protocol (SIP) signals between an IP multimedia subsystem (IMS) (P-SCCF) and user equipment (UE) (e.g., a mobile phone, a personal digital assistant, . . . ). This integrity prevents identity spoofing, man-in-the-middle attacks, and the like. The IMS represents a 3GPP and 3GPP2 effort to define an all-IP-based wireless network as a replacement for the various voice, data, signaling, and control network elements currently in existence. Furthermore, the IMS enables support for IP multimedia applications within the Universal Mobile Telecommunications System (UMTS). The UMTS is a 3G broadband packet-based transmission of text, ditized voice, video, and multimedia that offers a consistent set of services to mobile computer and phone users regardless of their physical location.

The telecom industry is currently shifting towards all IP-systems, thereby rendering dual mode service handsets an important tool (as they are compatible with existing cellular systems and emerging IP-systems). This shift is driven by desires to reduce costs and create new streams of revenue while protecting an operator business model. IMS is a new service domain that facilitates this shift by enabling convergence of data, speech, and network technology over an IP-based infrastructure. For users, IMS-based services enable transmittal and receipt of various data at significantly reduced cost, including voice, text, pictures, video, and/or any combination thereof in a highly personalized and secure manner. In summary, IMS is designed to bridge the gap between existing, traditional telecommunications technology and Internet technology that increased bandwidth does not provide.

As stated above, these emerging IP-based technologies have created demand for dual mode services, and thus for dual mode handsets. Using this technology, users can employ WiFi to effectuate voice calls, transmission of data, and the like. In more detail, a user can connect to a LAN by way of WiFi. Upon such connection, users can employ services offered by their service provider.

SUMMARY

The following presents a simplified summary in order to provide a basic understanding of some aspects of the claimed subject matter. This summary is not an extensive overview, and it is not intended to identify key/critical elements of the claimed subject matter or to delineate the scope thereof. Its sole purpose is to present some concepts in a simplified form as a prelude to the more detailed description that is presented later.

The claimed subject matter relates generally to dual mode services, and more particularly to monitoring and controlling mobility management transactions with respect to dual mode services. In particular, a request for a mobility management transaction can be received by a Home Public Land Mobile Network (HPLMN) from an enterprise network upon a subscriber associated with such enterprise network roaming into or out of the enterprise network. For example, the enterprise network can create an SS7 or Sigtran message that includes a Mobile Application Part (MAP) message (a request for a MAP transaction), and can provide such message to a Signal Transfer Point (STP). The MAP message can be a Location Update message, a Send Routing Information message, a Subscriber Location Report message, or any other suitable MAP message. An analysis can then be undertaken at the STP regarding whether an enterprise that maintains the enterprise network and/or particular subscriber is authorized to request dual mode services from the HPLMN.

For example, an originating point code within the SS7 or Sigtran message can be reviewed to determine an identity of the enterprise. A provisioning database can thereafter be accessed to ensure that the enterprise is authorized to utilize dual mode services provided by the HPLMN. A further analysis can then be undertaken to determine that the SS7 or Sigtran message is or includes a mobility management message (a MAP message), and a type of such transaction can be determined. The provisioning database can thereafter be accessed to determine if the enterprise is authorized to request a mobile management transaction of the determined type. For instance, an enterprise may purchase services from the HPLMN that enable subscribers of the enterprise to request Location Update transactions but not Send Routing information transactions. If no subscribers within the enterprise have such authorization, the request for the transaction can be denied.

The SS7 or Sigtran message can additionally be analyzed to determine an identity of a subscriber that will be affected by the mobile management transaction. In particular, an International Mobile Subscriber Identity (IMSI) value within the SS7 message can be reviewed to determine the identity of the subscriber. Pursuant to an example, a subscriber may roam into the enterprise network, and the enterprise network may then request a Location Update transaction with respect to the subscriber. Different subscribers, however, can be provided with different rights and privileges with respect to mobility management transactions. For instance, a first subscriber associated with the enterprise may be authorized to request a Location Update transaction while a second subscriber associated with the enterprise may not be authorized to request a Location Update transaction. The rights of subscribers can be defined in a dual mode services agreement between the enterprise and the HPLMN.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
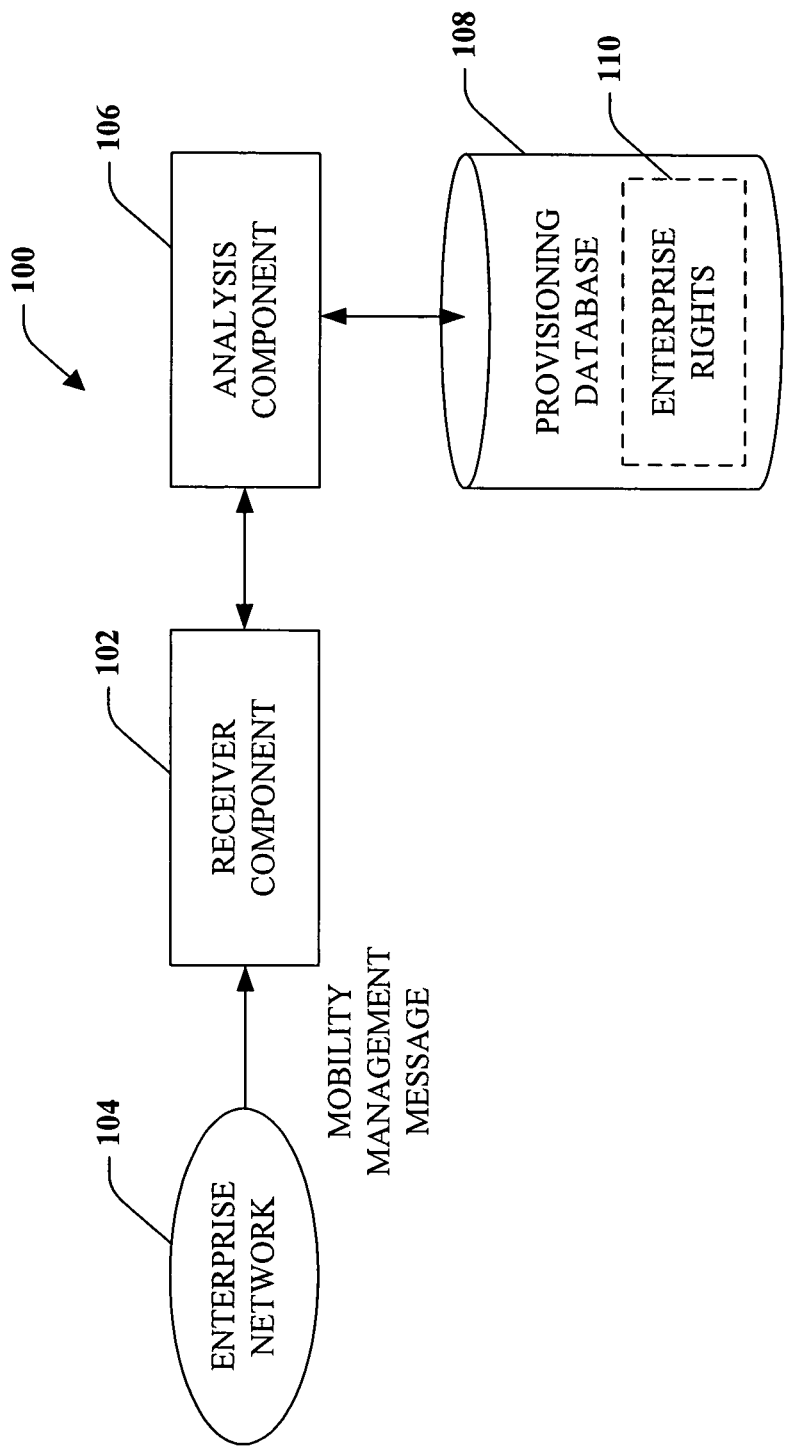
FIG. 1 is a high level block diagram of a system that facilitates detecting, analyzing, and selectively enabling mobility management transactions with respect to dual mode handsets.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such matter can be practiced without these specific details. In other instances, well-known structures and devices are shown in block diagram form in order to facilitate describing the claimed subject matter.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computing device, such as a mobile handset, to implement the disclosed subject matter. The term "article of manufacture" as used herein is intended to encompass a computer program accessible from any computer-readable device, carrier, or media. For example, computer readable media can include but is not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Turning now to the drawings, FIG. 1 illustrates a system 100 that facilitates detecting, analyzing, and selectively enabling requests for mobility management transactions, such as Mobile Application Part (MAP) transactions, with respect to dual mode handsets. The system 100 includes a receiver component 102 that receives a request for a mobility management transaction from an enterprise network 104 that desirably receives dual mode services from a wireless provider, wherein the request originates from a subscriber associated with the enterprise network 104.

To enable utilization of dual mode services, a Home Public Land Mobile Network (HPLMN) executes mobility management transactions requested by the enterprise network 104. For example, a mobile handset may roam from a GSM network to the enterprise network 104 (e.g., a geographic location covered by a wireless LAN of the enterprise), and the enterprise network 104 can initiate a Location Update transaction (one example of a mobility management transaction). Location Update transactions are typically employed in connection with redirecting mobile terminated calls to an appropriate E.164 number associated with the enterprise network 104, wherein mobile terminated calls are calls that are intended for a mobile handset. Other MAP transactions include Send Routing Information transactions and Subscriber Location Report transactions, but it is understood that these example transactions are provided for illustration purposes and are not intended to limit the scope of the claimed subject matter. Rather, any suitable mobility management transactions (MAP transactions) are contemplated by the inventor of the subject invention and intended to fall under the scope of the hereto-appended claims.

Because the handset is registered with the HPLMN (which can provide a GSM network), a Home Location Register (HLR) of the HPLMN must be employed to undertake mobility management. The enterprise associated with the enterprise network 104, however, may desirably be provided with different rights with respect to different mobility management transactions (MAP transactions). In a particular example, the network provider may wish to allow the enterprise network 104 to request a Location Update transaction but not a Send Routing Information transaction. Additionally, it may be desirable to provide certain subscribers of the enterprise with particular rights with respect to one or more MAP transactions. For instance, a first subscriber within the enterprise may desirably be associated with rights with respect to a Location Update transaction while it may not be desirable for a second subscriber within the enterprise 104 to be associated with rights with respect to a Location Update transaction.

To that end, the system 100 can include an analysis component 106 that analyzes a request for a mobility management transaction and determines whether the enterprise network 104 is authorized to request the transaction and/or whether an individual subscriber that is desirably employing the service is authorized to utilize the service. For instance, the analysis component 106 can access a provisioning database 108 that includes enterprise rights 110, and can compare the enterprise rights 110 with the mobility management transaction request. If the enterprise and/or subscriber associated therewith is authorized to employ a requested mobility management transaction, an HLR (not shown) can be provided with the request for execution thereof. It the enterprise 104 and/or subscriber associated therewith is not authorized to utilize a requested mobility management transaction, the analysis component 106 can prevent execution of the requested transaction.

The provisioning database can additionally be accessed by the analysis component 106 to determine rights associated with certain mobility management transactions with respect to particular IMSI values. The analysis component 106 thus can determine mobility transaction rights with respect to a particular enterprise and a certain subscriber with respect to one or more mobility management transactions. Additionally, the analysis component 106 can update the provisioning database 108 as access rights change. Pursuant to one example, upon an enterprise paying particular fees, the provisioning database 108 can be updated to allow certain subscribers within the enterprise to utilize mobility management transactions. Additionally, the provisioning database 108 can be associated with billing functionality, such that transactions are monitored and costs associated with the transactions are recorded (for billing purposes). An HPLMN can manage the contents of the provisioning database 108 and update such contents as circumstances alter (e.g., as enterprises add or remove dual mode services).

An example is provided herein to better illustrate novel features of the system 100. It is to be understood and appreciated that this example is for illustrative purposes only, and is not intended to limit the scope of the appended claims. A network provider associated with the receiver component 102 and the analysis component 106 can enable and maintain dual mode services with respect to the enterprise that maintains the enterprise network 104. The enterprise network 104 can then begin creating Signaling System 7 (SS7) or Sigtran messages and providing them to the receiver component 102. While GSM and SS7 signaling is utilized to illustrate operation of the system 100 in this example, it is understood that the claimed subject matter is intended to encompass any suitable wireless network and any service that needs access to a (HPLMN). The SS7 messages can include an originating point code, and the analysis component 106 can analyze the originating point code to determine whether the enterprise is associated with authorization to employ dual mode services offered by the HPLMN.

If the enterprise is authorized, the analysis component 106 can further analyze the SS7 message and determine that it is, for instance, a MAP message, and can then determine a type of transaction within the MAP message (e.g., a Location Update transaction, a Send Routing Information transaction, . . . ). The analysis component 106 can access the provisioning database 108 and determine if at least one subscriber within the enterprise is authorized to initiate/use the requested mobility management transaction (MAP transaction). If the enterprise is authorized, the analysis component 106 can determine a subscriber with respect to whom the transaction is to be effectuated by reviewing a unique identifier that is within the SS7 message, such as an International Mobile Subscriber Identity (IMSI) number. The analysis component 106 can review contents of the provisioning database 108 in connection with the determined subscriber identity and ensure that the requested mobility management transaction is allowed with respect to the identified subscriber.

In accordance with one particular example, the analysis component 106 can be located within a Signal Transfer Point (STP), which is an SS7 node that interfaces an HPLMN with the outside world. Additionally or alternatively, the analysis component 106 can be located within Mobile Switching Center (MSC), such as a Gateway MSC, a Visited MSC, etc. Moreover, the analysis component 106 can undertake the above-described analysis at an HLR, a Visitor Location Register (VLR), or any other suitable location within an HPLMN.

Figure 2:
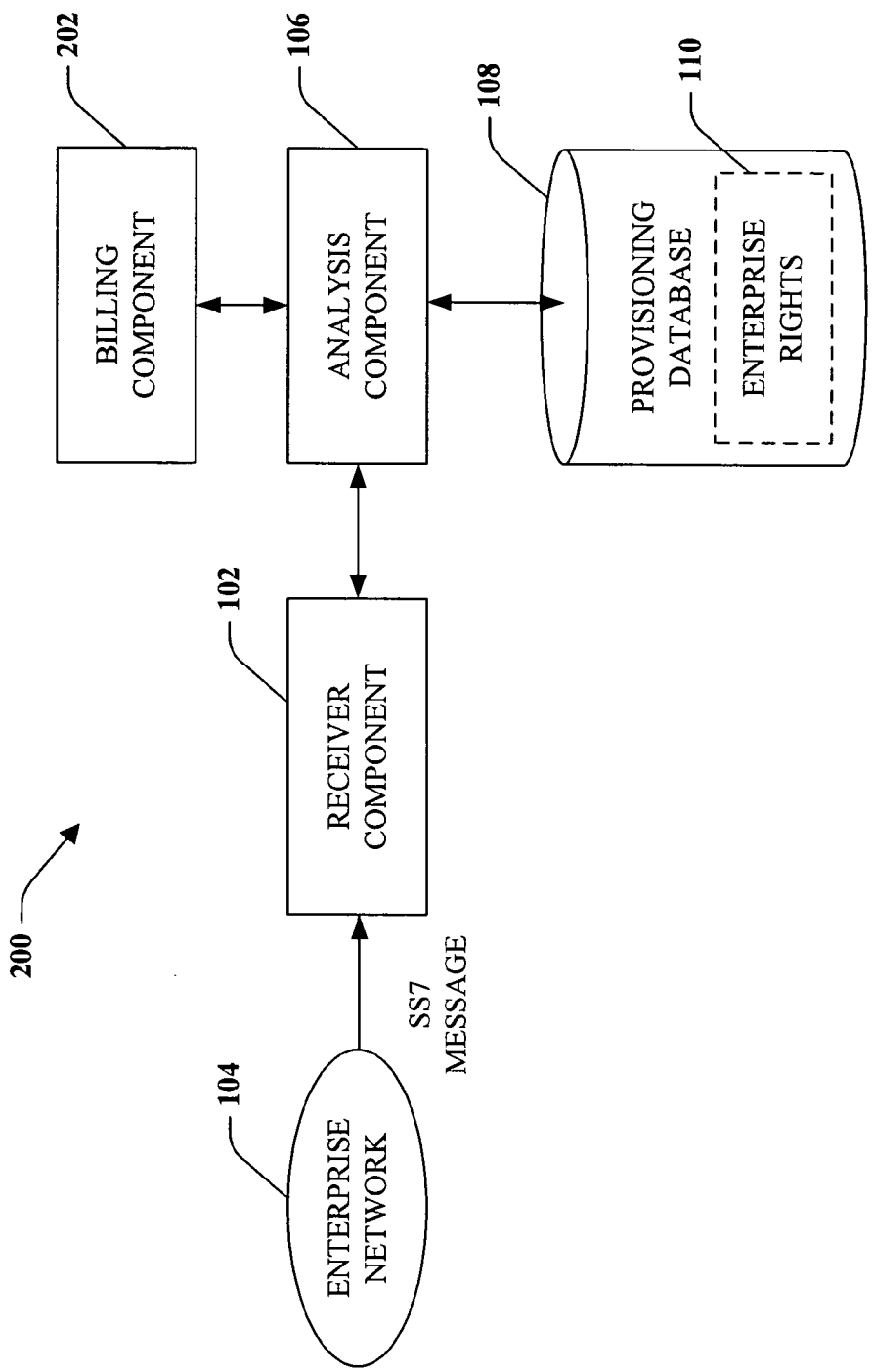
FIG. 2 illustrates a mobility management message analysis system that includes billing functionality.

Now referring to FIG. 2, a system 200 that facilitates automatically determining whether an enterprise and/or subscriber is authorized to utilize particular mobility management transactions is illustrated. The system 200 includes the receiver component 102 that can receive an SS7 and/or Sigtran message, wherein the message includes an originating point code, an identifier that is indicative of content of the message, a MAP transaction, and an IMSI number that identifies a subscriber that is to be associated with the MAP transaction. For instance, the enterprise network 104 can be associated with a nationwide LAN and can have various wireless access points. Accordingly, the enterprise may wish that their employees utilize a WLAN within the enterprise network 104 when they are within coverage area of such network 104, and a wireless service provider when they are outside coverage of the enterprise network 104. The wireless service provider, however, may still need to provide services to subscribers associated with the enterprise network 104. Pursuant to an example, when a handset associated with the enterprise is within a WLAN of the enterprise network 104, the wireless service provider will need to route calls directed for the handset to an E.164 number associated with the enterprise network 104. The wireless service provider (e.g., the HPLMN) can additionally provide other mobility management services.

The HPLMN, however, may wish to monitor, regulate, and/or charge the enterprise for particular mobility management transactions that facilitate use of dual mode services. To that end, the SS7 (or Sigtran) message can be received by the receiver component 102 and analyzed by the analysis component 106, which, for instance, can be within an STP that is maintained by the HPLMN. The analysis component 106 can review the originating point code within the SS7 or Sigtran message and determine an identity of the enterprise network 104 that is providing the message. The analysis component 106 can access the provisioning database 108 to review the enterprise rights 110, and can determine whether the enterprise is authorized to employ services offered by the HPLMN. If no, the analysis component 106 can reject the request for the transaction. In another example, a billing component 202 can be employed to automatically charge the enterprise an agreed-upon fee and/or maintain a record of charges. Still further, the billing component 202 can output a message that describes services and fee rates with respect to mobility management transactions.

If the enterprise is registered with the HPLMN that is associated with the analysis component 106, the analysis component 106 can further review the SS7 or Sigtran message and determine that it includes a request for a mobility management transaction, such as a MAP transaction. The analysis component 106 can again access the provisioning database 108 and determine whether the enterprise 104 is authorized with respect to mobility management transactions. If the analysis component 106 determines that the enterprise 104 is not authorized, the analysis component 106 can reject the request for the transaction (regardless of transaction type). In another example, the billing component 202 can provide the enterprise with payment options with respect to mobility management transactions.

If the enterprise 104 is authorized with respect to at least one mobility management transaction, the analysis component 106 can review the SS7 or Sigtran message and determine what type of mobility management transaction is requested, such as a Location Update transaction, a Send Routing Information transaction, etc. The analysis component 106 reviews the provisioning database 108 to determine what rights are associated with the enterprise 104 with respect to the determined type of transaction. In other words, the analysis component 106 determines whether at least one subscriber associated with the enterprise 104 is authorized to undertake the determined type of mobility management transaction. In one example, the enterprise may have unlimited rights with respect to a first type of transaction while only being able to utilize a second type of transaction a limited number of times. Still further, the enterprise may be on a pay per transaction plan, such that the billing component 202 charges the enterprise an agreed-upon fee with respect to each undertaken mobility management transaction of certain type(s).

After the analysis component 106 has determined that the enterprise 104 includes at least one subscriber that is authorized to request and utilize transactions of the transaction type identified within the SS7 or Sigtran message, the analysis component 106 can analyze an identifier within the SS7 (or Sigtran) message that identifies a subscriber associated with the requested mobility management transaction. In other words, some subscribers within the enterprise 104 may be authorized with respect to a certain transaction type while others may not be authorized with respect to the same transaction type. Accordingly, the analysis component 106 can review the provisioning database 108 to determine whether the subscriber identified within the received message is authorized with respect to the mobility management transaction identified within the received SS7 or Sigtran message. If the analysis component 106 determines that the subscriber is authorized, the analysis component 106 can relay the request, for instance, to a VLR of the HPLMN. Otherwise, the analysis component 106 can be utilized in connection with refusing the transaction. Additionally or alternatively, the enterprise can be billed with respect to particular subscribers by the billing component 202. For instance, the enterprise may wish that a first subscriber not be authorized to utilize mobility management transactions while wishing that a second subscriber be authorized and billed per transaction (rather than a blanket fee). The billing component 202 and the analysis component 106 can act in conjunction to effectuate this and any other suitable billing arrangement.

Figure 3:
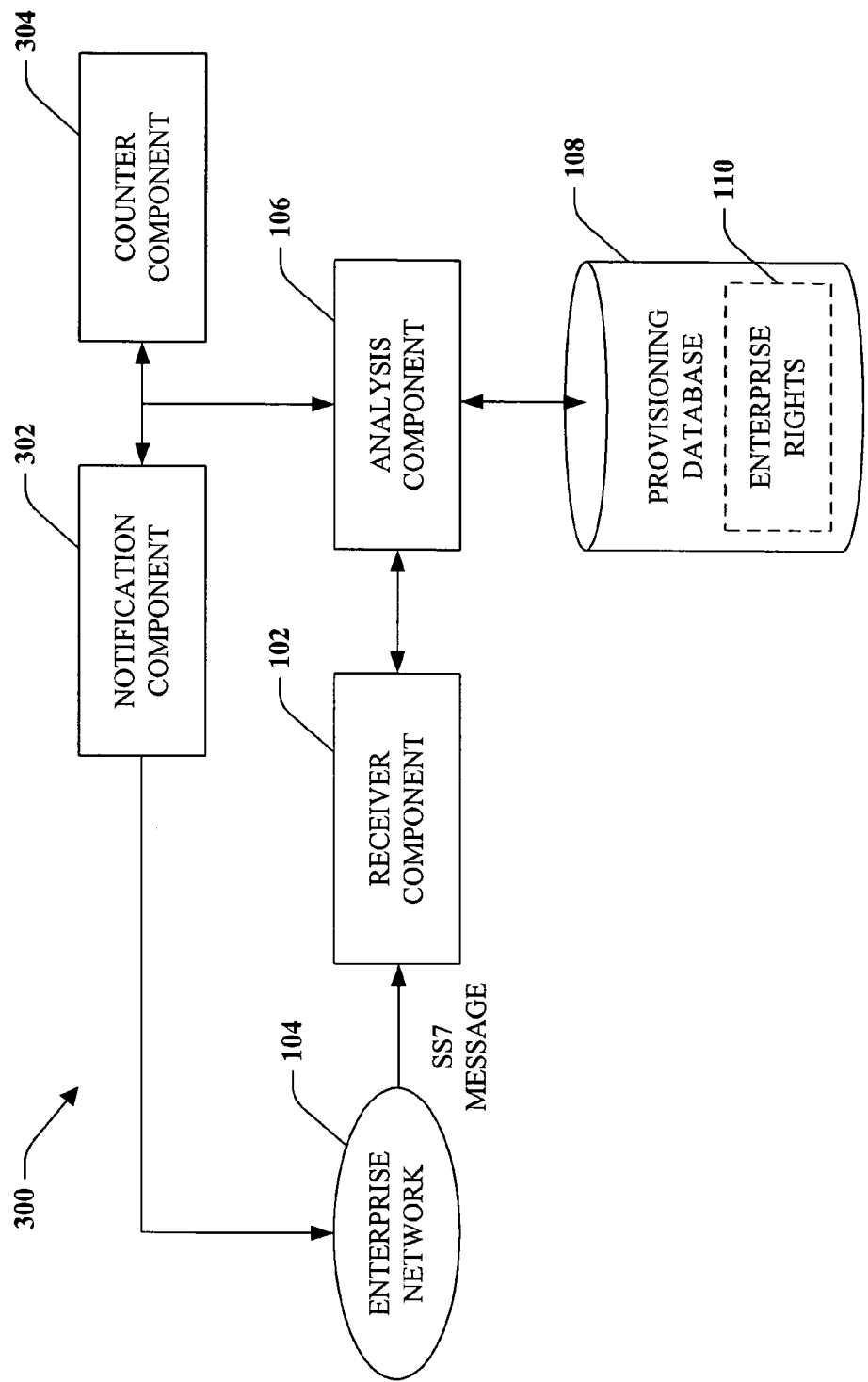
FIG. 3 illustrates a block diagram of a system that facilitates notifying an enterprise that a subscriber therein is not authorized to request a particular requested mobility management transaction.

Turning now to FIG. 3, a message analysis system 300 within a wireless communications environment is illustrated. The system 300 includes the receiver component 102 and the analysis component 106, which act as described above. The system 300 can additionally include a notification component 302 that provides notifications to the enterprise based at least in part upon the analysis undertaken by the analysis component 106. For example, if the analysis component 106 determines that the enterprise is not authorized with respect to a transaction type within the received SS7 or Sigtran message, the notification component 302 can inform the enterprise of the lack of authorization as well as provide instructions and/or mechanisms to obtain authorizations. Pursuant to an example, the notification component 302 can provide an SMS message that includes instructions for obtaining additional services from the HPLMN. In another example, the notification component 302 can generate an email and provide it to an executive of the enterprise, wherein the email can include instructions for obtaining additional services, hyperlinks directing the executive to where payments can be made, etc.

The system 300 further includes a counter component 304 that can count a number of occurrences of mobility management transaction requests. For example, the enterprise may have a plan where a particular number of certain transactions are allowed within a billing cycle (e.g., one month). Once over that amount, the enterprise 104 can charged on a per transaction basis. The counter component 304 can additionally perform more granular counting of transactions, such as on a per subscriber basis, a per subscriber with respect to certain mobility management transaction(s) basis, etc. The counting component 304 can be communicatively coupled to the analysis component 106 (or can be included within the analysis component 106). As the analysis component 106 analyzes content of a received SS7 or Sigtran message, results of the analysis can be passed to the counter component 304. The counter component 304 can also be associated with the notification component 302. For example, if the counter component 304 determines that a number of transactions has reached a maximum amount allowed with respect to the enterprise (without the enterprise paying on a per transaction basis), the notification component 302 can notify the enterprise that they will be charged a particular amount for each subsequent transaction. The content of a notification output by the notification component 302 can depend upon results of an analysis undertaken by the analysis component 106, a number of authorized transactions determined by the counter component 304, and a service plan associated with the enterprise.

Figure 4:
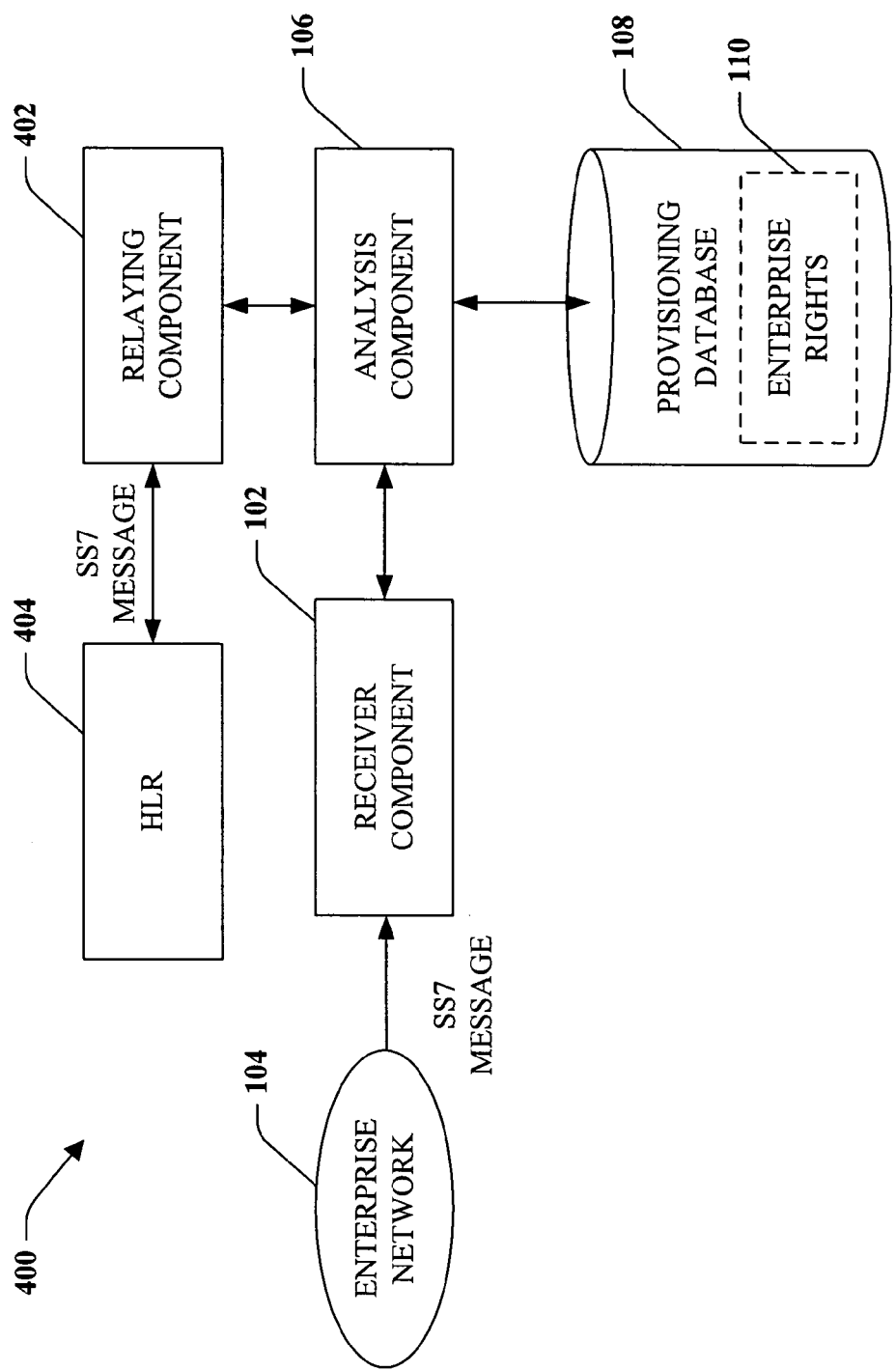
FIG. 4 illustrates a block diagram of a system for reporting an allowed mobility management transaction to an HLR.

Turning now to FIG. 4, a system 400 that analyzes contents of SS7 or Sigtran messages in connection with dual mode services is illustrated. The system 400 includes the receiver component 102 and the analysis component 106, which act in conjunction as described above. The system 400 can additionally include a relaying component 402, which can relay an SS7 message to an HLR 404 if the analysis component 106 determines that the requested transaction is authorized (with respect to the enterprise and particular subscriber). In one particular example, at least the analysis component 106 and the relaying component 402 can be included within an STP. It is understood that the relaying component 402 may not be directly connected to the HLR 404. For instance, the relaying component 402 can relay the SS7 message to a VLR, which in turn can provide the message to the HLR 404. Upon receipt of the SS7 message, the HLR 404 can, in conjunction with other networking components, then execute the transaction.

Figure 5:
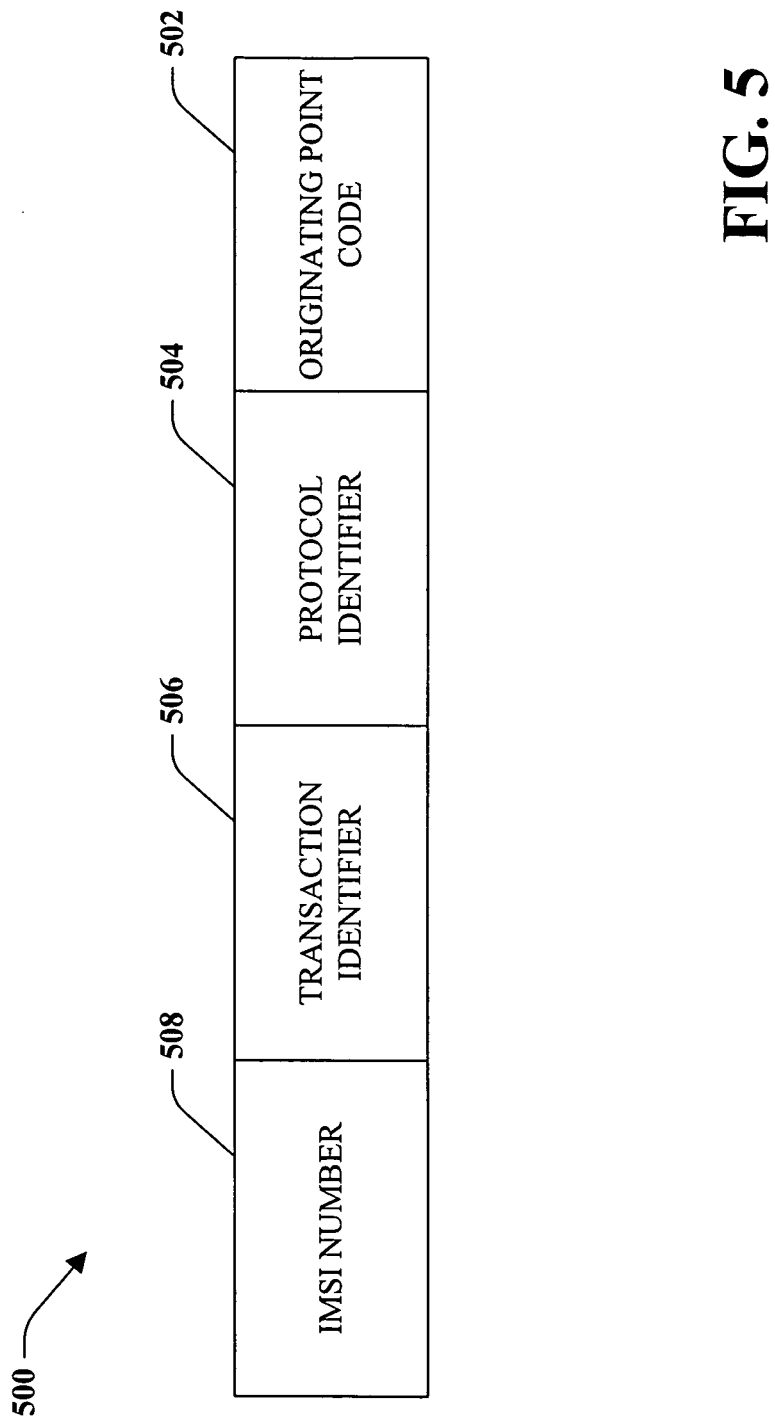
FIG. 5 is an illustration of example contents of an SS7 or Sigtran message that can be utilized to provision a mobility management transaction request.

Turning now to FIG. 5, example contents 500 of an SS7 or Sigtran message is illustrated, wherein the contents 500 can be analyzed by the analysis component 106 (FIGS. 1-4). The contents include an originating point code 502, which can be utilized to identify an enterprise. For instance, the originating point code 502 can be an E.164 number associated with the enterprise. The analysis component 106 can determine an identity of an enterprise upon analyzing such originating point code 502. The SS7 or Sigtran message can additionally include a protocol identifier section 504. For example, the section 504 can include data that indicates that the contents 500 further include a MAP transaction. The contents 500 can also include a transaction 506, and the analysis component 106 can analyze the transaction to determine a type of such transaction (e.g., Location Update, Send Routing Information, . . . ). An IMSI 508 that uniquely identifies a subscriber associated with the transaction can also be included within the SS7 message. The analysis component 106 can review these contents 500 and dynamically determine whether the transaction should be executed.

Figure 6:
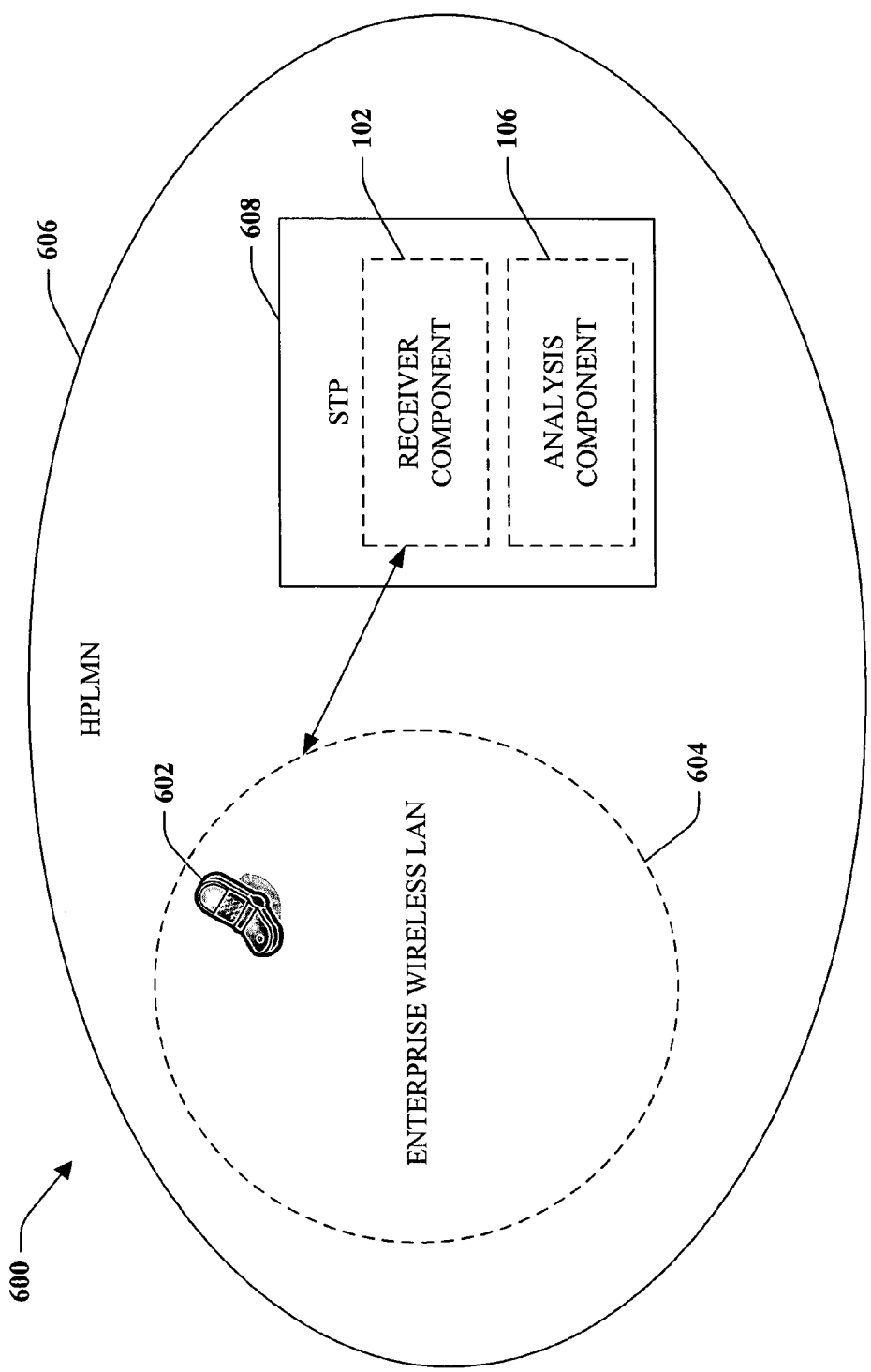
FIG. 6 illustrates wireless environments wherein an analysis of a mobility management transaction request can be undertaken.

Now referring to FIG. 6, a representative diagram 600 illustrating one exemplary use of components of the systems described herein is provided. A subscriber 602 roams into a wireless LAN 604 of an enterprise associated with such subscriber. Coverage area of the wireless LAN 604 can be overlapped with coverage area of an HPLMN 606 that provides dual mode services to the enterprise. The HPLMN includes or is associated with an STP 608, which acts as a bridge between the HPLMN and the enterprise network. When the subscriber 602 enters coverage area of the wireless LAN 604, the enterprise network (shown again as the wireless LAN 604) can provide the STP 608 with an SS7 message that includes a MAP message (a Location Update message) and an identity of the subscriber 602 (e.g., IMSI value(s)). A Location Update transaction is desirably undertaken to enable the HPLMN 606 to redirect mobile terminated calls to an E.164 number of the enterprise.

The STP 608 can include the receiver component 102 and the analysis component 106. The analysis component 106 can analyze contents of the SS7 message to determine identity of the enterprise, MAP message type, and subscriber identity. The analysis component 106 can thereafter apply appropriate treatment to the MAP message to allow or deny a MAP transaction that correlates to the message based at least in part upon the enterprise's and/or subscriber's commercial arrangement with the HPLMN 606. For instance, the subscriber 602 may not be associated with Location Update services.

Figure 7:
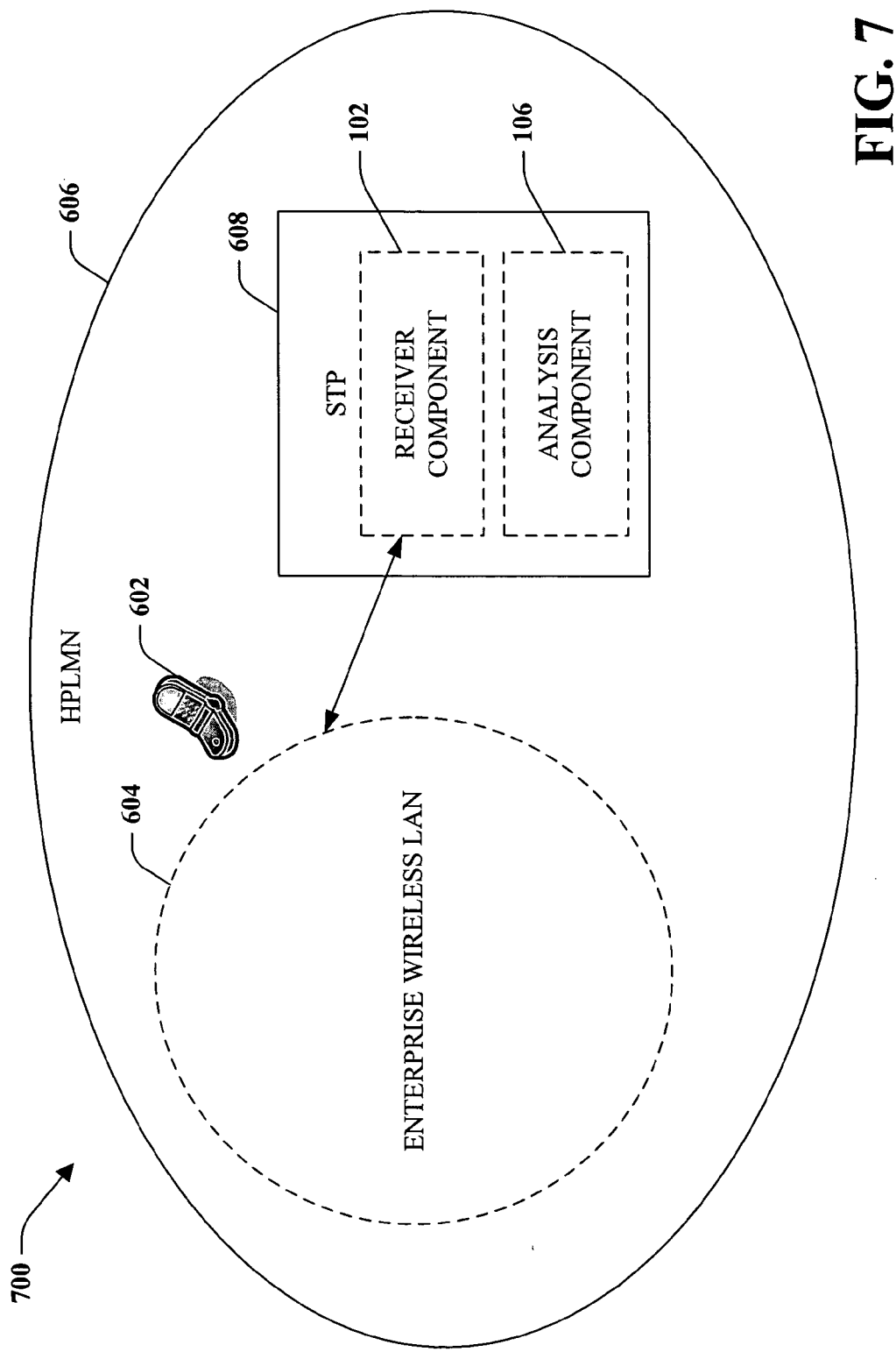
FIG. 7 illustrates wireless environments wherein an analysis of a mobility management transaction request can be undertaken.

Turning now to FIG. 7, a representative diagram 700 illustrating one exemplary use of components of the systems described herein is provided. The subscriber 602 exits the wireless LAN 604 and roams into coverage area associated with the HPLMN 606. In this case, the enterprise network (shown as the wireless LAN 604) can provide the STP 608 with an SS7 message that includes a MAP message (a Send Routing Information message) and an identity of the subscriber 602 (e.g., IMSI value(s)). The Send Routing Information message is utilized to redirect mobile terminated calls to an E.164 number of the HPLMN 606. The analysis component 106 can apply the appropriate treatment to the MAP message to allow or deny a MAP transaction that correlates to the message based at least in part upon the enterprise's and/or subscriber's commercial arrangement with the HPLMN 606.

Figure 8:
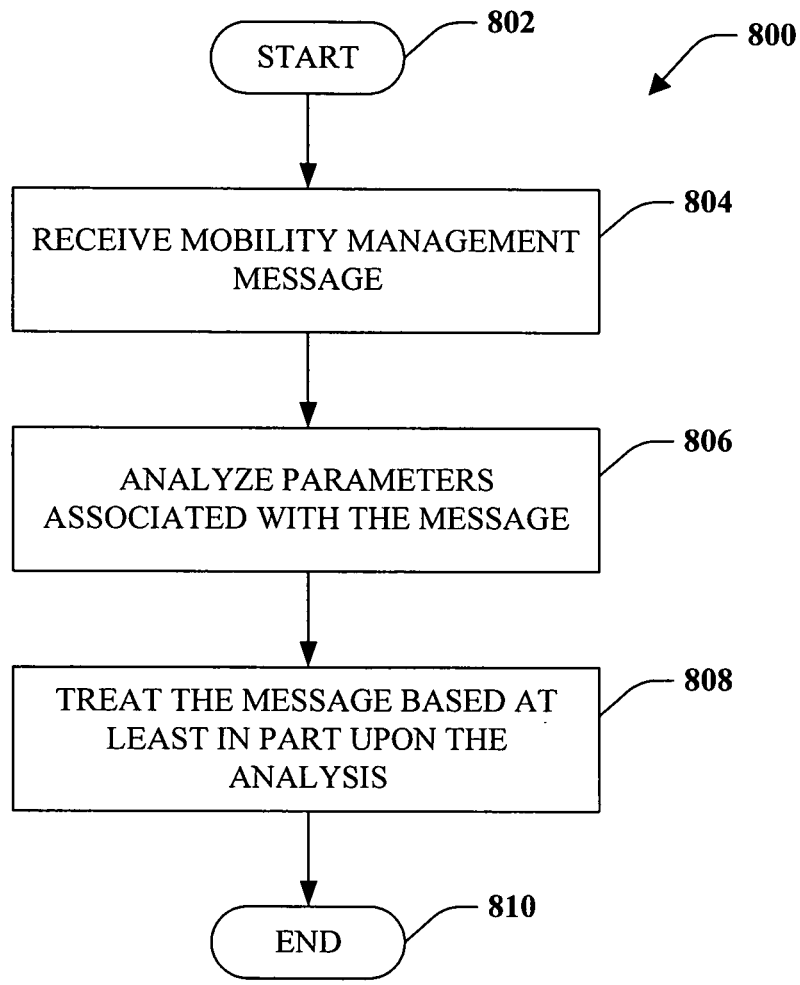
FIG. 8 is a representative flow diagram illustrating a methodology for treating a received mobility management transaction request based upon an analysis of parameters associated with the request.
Figure 9:
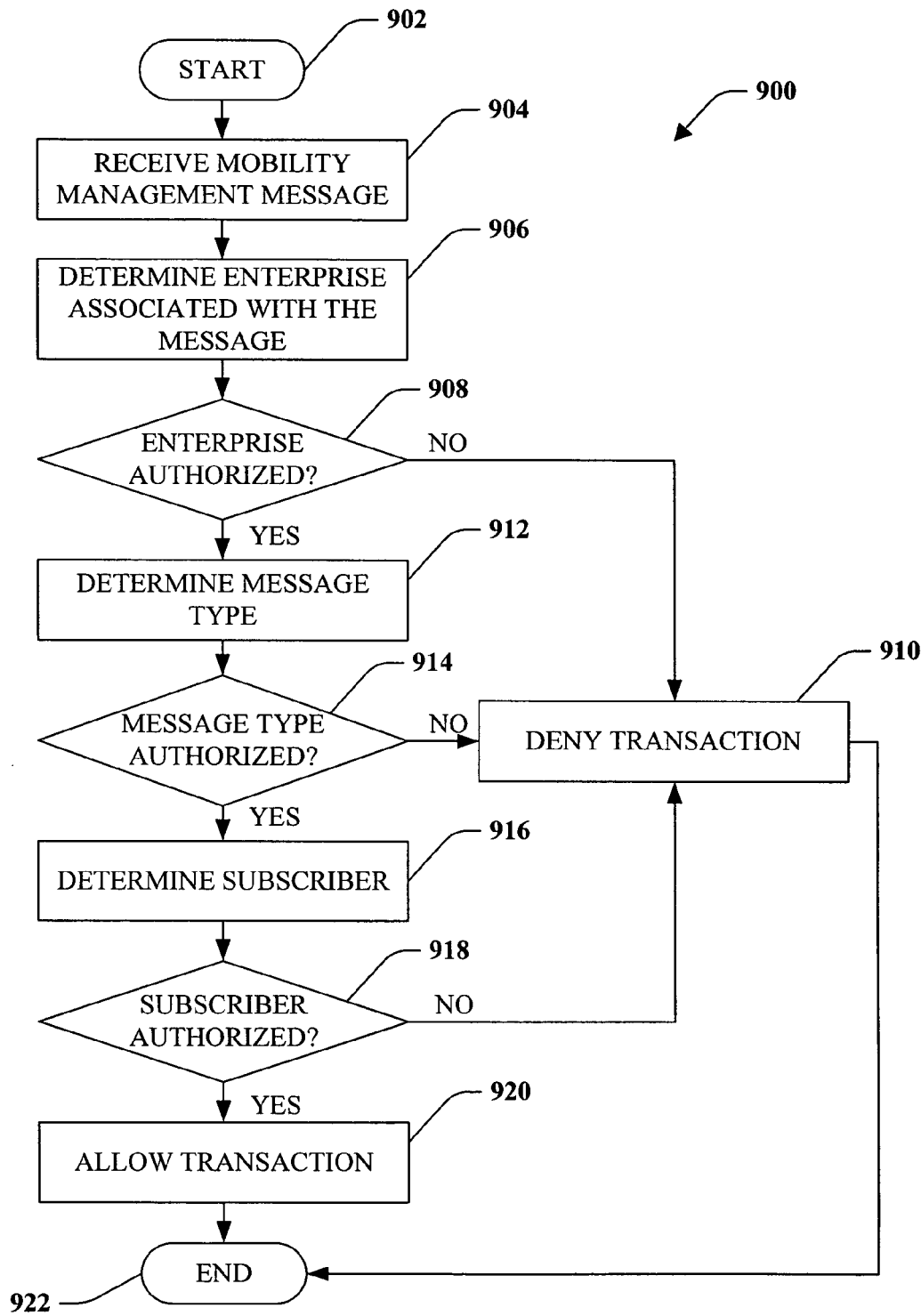
FIG. 9 is a representative flow diagram illustrating a methodology for determining whether to allow or deny a request for a mobility management transaction.
Figure 10:
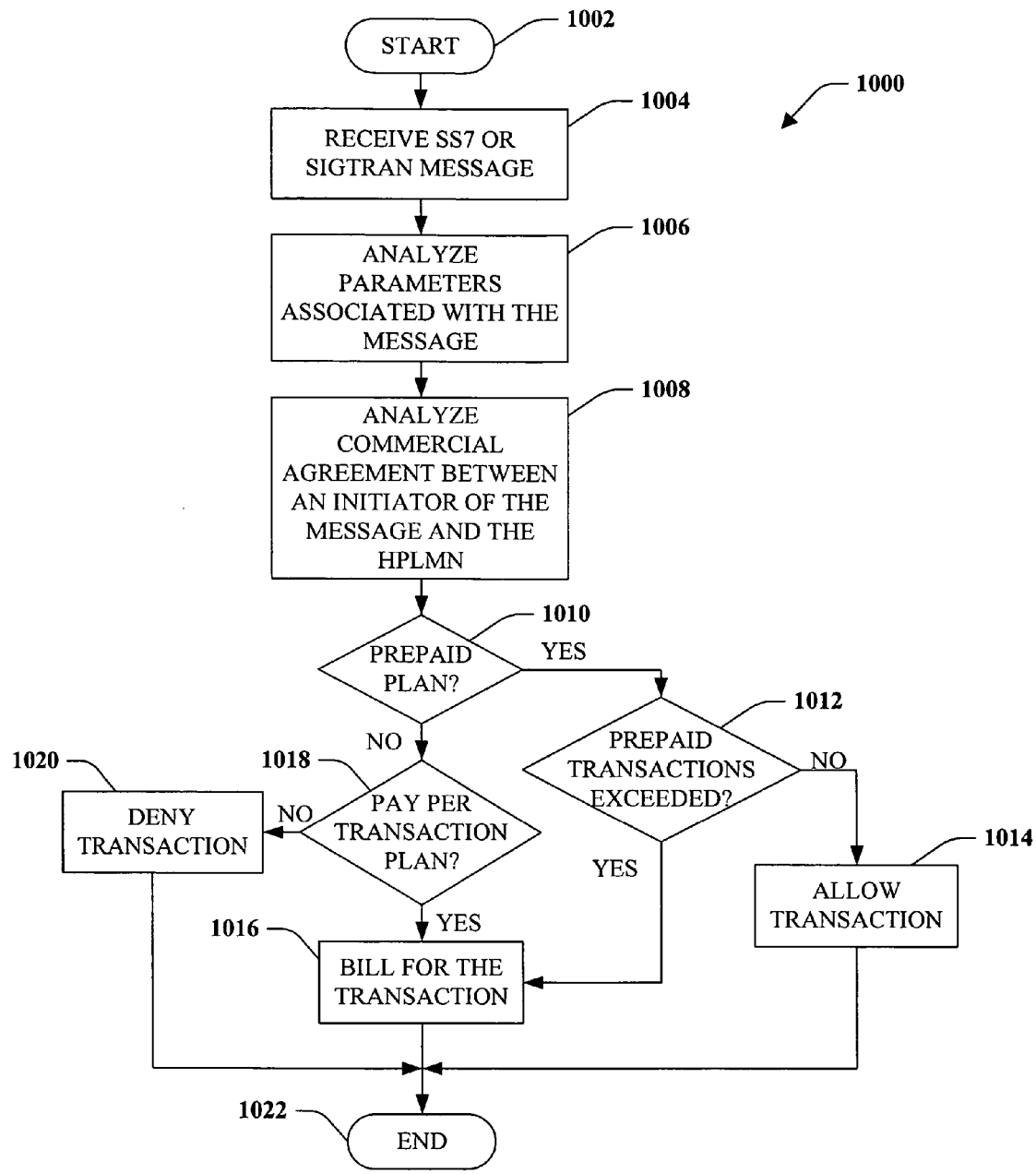
FIG. 10 is a representative flow diagram illustrating a methodology for determining whether to allow or deny a request for a mobility management transaction and determining how to bill the requesting entity.

Referring to FIGS. 8-10, methodologies in accordance with various aspects of the claimed subject matter are illustrated. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Turning specifically to FIG. 8, a methodology 800 for monitoring and controlling mobility management requests with respect to dual mode services is illustrated. The methodology 800 begins at 802, and at 804 a mobility management message is received. Pursuant to one example, the mobility management message can be received from an enterprise network at an STP. The term "enterprise" as utilized herein is intended to encompass a plurality of associated subscribers (e.g., within a business) as well as individual subscribers who wish to receive dual mode services from a wireless provider. The mobility management message can be encapsulated within an SS7 or Sigtran message, for instance, and can further be a MAP message. Additionally or alternatively, the message can be received at a VLR, an HLR, or any other suitable component within a wireless network.

At 806, parameters associated with the received message are analyzed. More specifically, an identity of an enterprise that initiates the message can be determined by analyzing an originating point code within the message. In another example, MAP message type can be discerned (e.g., whether the MAP message is a Location Update message, a Send Routing Information message, . . . ). Still further, a specific subscriber (or subscribers) that is associated with the mobility management message can be determined by reviewing the mobility management message. At 808, the message is treated based at least in part upon the analysis. For example, the enterprise may have a commercial agreement with the wireless network provider (the HPLMN) to enable only certain mobility management transactions (which are initiated by received mobility management messages). Still further, the enterprise may wish that certain subscribers have particular rights with respect to one or more mobility management transactions. Therefore, the received message can be treated based upon the analysis and the commercial agreement, wherein treatment relates to enabling or denying a transaction associated with the received message. The methodology 800 then completes at 810.

Now turning to FIG. 9, a methodology 900 for determining whether to allow or deny a mobility management transaction requested by an enterprise network is illustrated. The methodology 900 starts at 902, and at 904 a mobility management message is received. As described above, the mobility management message can be an SS7 message that includes a MAP message, such as a Location Update message. Other suitable mobility management messages, however, are contemplated by the inventor and intended to fall under the scope of the hereto-appended claims. As described above, the mobility management message can be received at an STP, a MSC, a VLR, an HLR, etc. At 906, an enterprise that is associated with the message is determined. Pursuant to one example, the enterprise network can initiate the mobility management message, and such message can be received at an STP. The message can include an originating point code, which may be all or a portion of an E.164 number associated with the enterprise. By analyzing this originating point code, an identity of the enterprise network that initiated the mobility management message can be ascertained.

At 908, a determination is made regarding whether the enterprise is authorized to receive and use dual mode services in connection with an HPLMN that receives the request. For example, a provisioning database can be accessed and reviewed for the enterprise. If it is determined that the enterprise is not authorized to receive and utilize dual mode services provided by the HPLMN, a transaction that corresponds to the mobility management message is denied at 910. If the enterprise is associated with authorization with respect to at least one mobility management transaction, then the methodology 900 proceeds to 912, where a type of the mobility management message is determined. For example, the message may be a MAP message, and such message can be analyzed to determine a type of such message (e.g., Location Update message, Send Routing Information message, . . . ).

The methodology 900 then proceeds to 914, where a determination is made regarding whether the enterprise is authorized with respect to the determined message type. Pursuant to one example, a service plan can be accepted by the enterprise that enables subscribers within the enterprise to utilize some mobility management transactions but not all mobility management transactions. If the enterprise is not authorized with respect to the determined mobility management message type, the corresponding mobility management transaction is denied at 910.

If the enterprise has a service plan that allows transactions of the type determined at 912 for at least one subscriber, then at 916 an identity of the subscriber is determined. For instance, an SS7 or Sigtran message can include the received mobility management message, and therein may reside an IMSI number associated with the subscriber that the desired transaction will affect. For instance, a subscriber may be roaming from an enterprise network to a cellular network, and the enterprise network may generate an SS7 message that includes a Location Update message (a MAP message) for the subscriber. Some subscribers, however, may have different rights with respect to substantially similar MAP transactions. After the subscriber's identity is discerned, a determination is made at 918 regarding whether the determined subscriber is authorized with respect to the requested transaction. If the subscriber is not authorized, the transaction is denied at 910. If the subscriber is authorized, then the transaction is allowed at 920 (the message is relayed to an HLR which undertakes an appropriate transaction). The methodology 900 then completes at 922.

Referring now to FIG. 10, a methodology 1000 for billing for certain mobility management messages or transactions is illustrated. The methodology 1000 starts at 1002, and at 1004 an SS7 or Sigtran message is received. For example, this message can be received at an STP. At 1006, parameters associated with the message are analyzed. For instance, an originating point code, a message type (e.g., a MAP message), a type of MAP message, and a subscriber associated with the MAP message can be determined by analyzing the SS7 or Sigtran message. At 1008, a commercial agreement between an initiator of the message (e.g., an enterprise) and an HPLMN that is to service the transaction is analyzed. For example, the enterprise may have a prepayment plan with respect to a subset of available MAP transactions, such that the enterprise can initiate a certain number of MAP transactions of particular types without additional payment. In another example, the enterprise may have an agreement with the HPLMN that each transaction requested by the enterprise may be associated with a particular fee, wherein the enterprise is cyclically billed.

At 1010, a determination is made regarding whether the enterprise has a prepaid plan agreement with respect to the HPLMN. If a prepayment plan exists, then at 1012 a determination is made regarding whether a number of prepaid transactions has been exceeded. If the number of prepaid transactions has not been exceeded, then at 1014 the requested transaction (within the SS7 or Sigtran message) is allowed. If it is determined at 1012 that the number of prepaid transactions has been exceeded, then at 1016 the enterprise is billed for the transaction according to a pre-defined agreement. If at 1010 it is determined that there is no prepaid plan, then at 1018 a determination is made regarding whether the enterprise and the HPLMN have agreed upon a pay per transaction plan. If there has been no agreement with respect to a pay per transaction plan, then the transaction is denied at 1020. If there is an agreement with respect to paying per transaction, then at 1016 the transaction is billed (and allowed). The methodology 1000 completes at 1022.
[End of My Review.]

Figure 11:
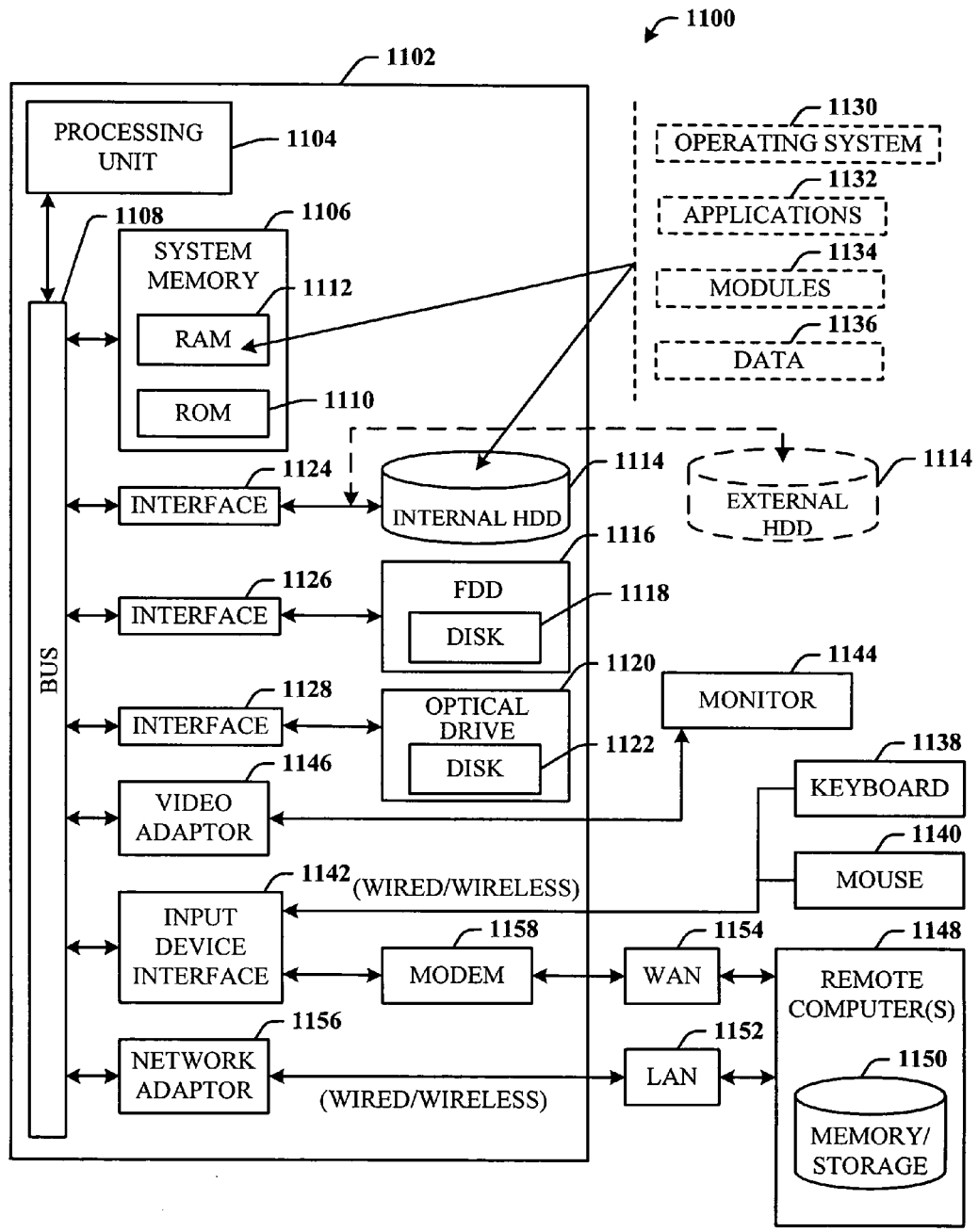
FIG. 11 is an exemplary computing environment that can be employed in connection with various aspects described herein.

Referring now to FIG. 11, there is illustrated a block diagram of a computer operable to aid in performing the analysis of a mobility management message as described above. In order to provide additional context for various aspects of the claimed subject matter, FIG. 11 and the following discussion are intended to provide a brief, general description of a suitable computing environment 1100 in which the various aspects described herein can be implemented. While the description above is in the general context of computer-executable instructions that may run on one or more computers, those skilled in the art will recognize that the claimed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 11, the exemplary environment 1100 for implementing various aspects includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures may also be employed as the processing unit 1104.

The system bus 1108 can be any of several types of bus structure that may further interconnect to a memory bus (with or without a memory controller), a peripheral bus, and a local bus using any of a variety of commercially available bus architectures. The system memory 1106 includes read-only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during start-up. The RAM 1112 can also include a high-speed RAM such as static RAM for caching data.

The computer 1102 further includes an internal hard disk drive (HDD) 1114 (e.g., EIDE, SATA), which internal hard disk drive 1114 may also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed innovation.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is to be appreciated that the innovation can be implemented with various commercially available operating systems or combinations of operating systems.

A user can enter commands and information into the computer 1102 through one or more wired/wireless input devices, e.g., a keyboard 1138 and a pointing device, such as a mouse 1140. Other input devices (not shown) may include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE 1394 serial port, a game port, a USB port, an IR interface, etc.

A monitor 1144 or other type of display device is also connected to the system bus 1108 via an interface, such as a video adapter 1146. In addition to the monitor 1144, a computer typically includes other peripheral output devices (not shown), such as speakers, printers, etc.

The computer 1102 may operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which may connect to a global communications network, e.g., the Internet.

When used in a LAN networking environment, the computer 1102 is connected to the local network 1152 through a wired and/or wireless communication network interface or adapter 1156. The adaptor 1156 may facilitate wired or wireless communication to the LAN 1152, which may also include a wireless access point disposed thereon for communicating with the wireless adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 via the serial port interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least WiFi and Bluetooth™ wireless technologies. Thus, the communication can be a predefined structure as with a conventional network or simply an ad hoc communication between at least two devices.

WiFi, or Wireless Fidelity, allows connection to the Internet from a couch at home, a bed in a hotel room, or a conference room at work, without wires. WiFi is a wireless technology similar to that used in a cell phone that enables such devices, e.g., computers, to send and receive data indoors and out; anywhere within the range of a base station. WiFi networks use radio technologies called IEEE 802.11 (a, b, g, etc.) to provide secure, reliable, fast wireless connectivity. A WiFi network can be used to connect computers to each other, to the Internet, and to wired networks (which use IEEE 802.3 or Ethernet). WiFi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 12:
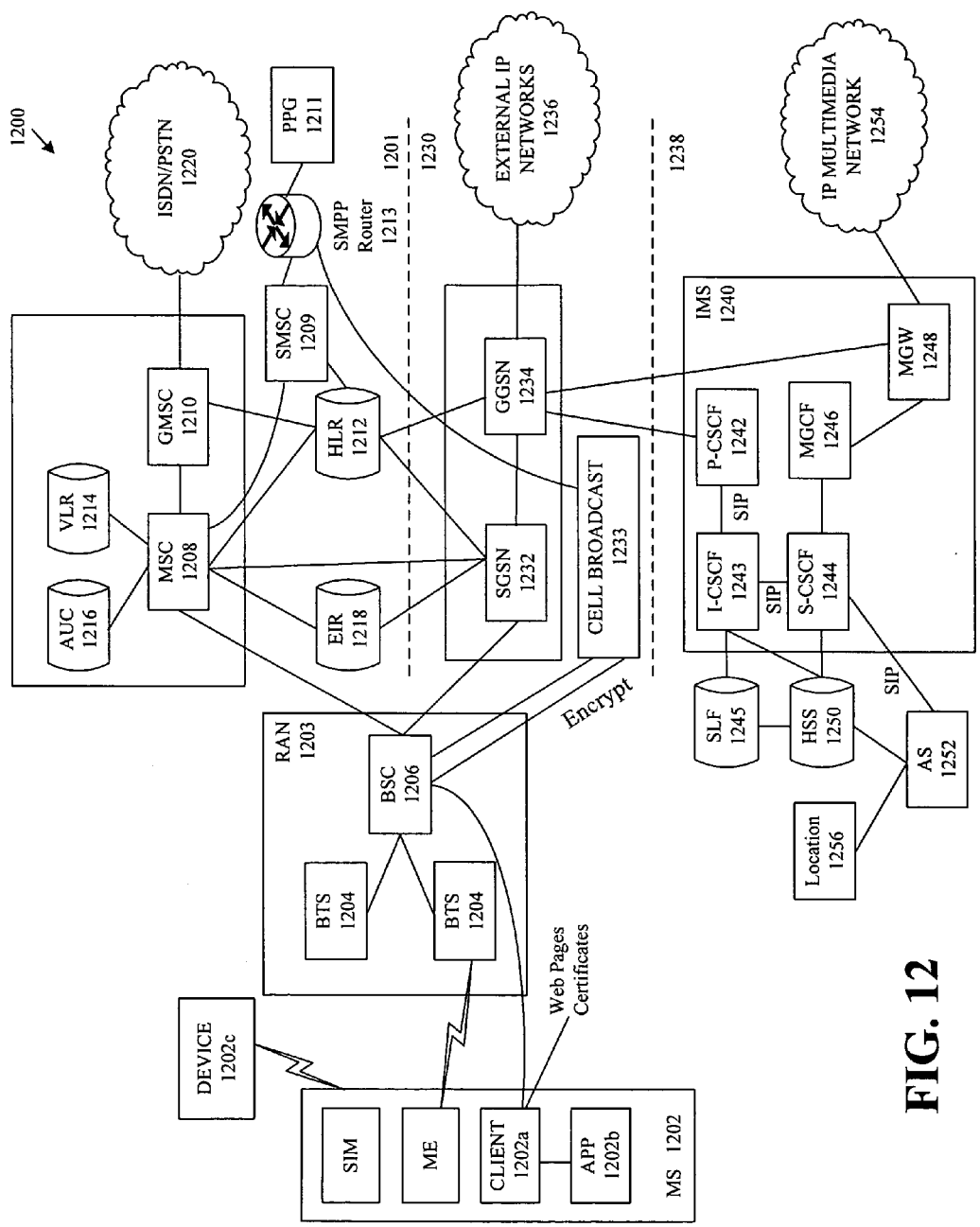
FIG. 12 is an exemplary networking environment.

Now turning to FIG. 12, such figure depicts a GSM/GPRS/IP multimedia network architecture 1200 that includes a GSM core network 1201, a GPRS network 1230 and an IP multimedia network 1238. The GSM core network 1201 includes a Mobile Station (MS) 1202, at least one Base Transceiver Station (BTS) 1204 and a Base Station Controller (BSC) 1206. The MS 1202 is physical equipment or Mobile Equipment (ME), such as a mobile phone or a laptop computer that is used by mobile subscribers, with a Subscriber identity Module (SIM). The SIM includes an International Mobile Subscriber Identity (IMSI), which is a unique identifier of a subscriber. The MS 1202 includes an embedded client 1202a that receives and processes messages received by the MS 1202. The embedded client 1202a may be implemented in JAVA and is discuss more fully below.

The embedded client 1202a communicates with an application 1202b that provides services and/or information to an end user. One example of the application may be navigation software that provides near real-time traffic information that is received via the embedded client 1202a to the end user. The navigation software may provide road conditions, suggest alternate routes, etc. based on the location of the MS 1202. Those of ordinary skill in the art understand that there are many different methods and systems of locating an MS 1202.

Alternatively, the MS 1202 and a device 1202c may be enabled to communicate via a short-range wireless communication link, such as BLUETOOTH. For example, a BLUETOOTH SIM Access Profile may be provided in an automobile (e.g., device 1202c) that communicates with the SIM in the MS 1202 to enable the automobile's communications system to pull information from the MS 1202. The BLUETOOTH communication system in the vehicle becomes an "embedded phone" that employs an antenna associated with the automobile. The result is improved reception of calls made in the vehicle. As one of ordinary skill in the art would recognize, an automobile is one example of the device 1202c. There may be an endless number of devices 1202c that use the SIM within the MS 1202 to provide services, information, data, audio, video, etc. to end users.

The BTS 1204 is physical equipment, such as a radio tower, that enables a radio interface to communicate with the MS. Each BTS may serve more than one MS. The BSC 1206 manages radio resources, including the BTS. The BSC may be connected to several BTSs. The BSC and BTS components, in combination, are generally referred to as a base station (BSS) or radio access network (RAN) 1203.

The GSM core network 1201 also includes a Mobile Switching Center (MSC) 1208, a Gateway Mobile Switching Center (GMSC) 1210, a Home Location Register (HLR) 1212, Visitor Location Register (VLR) 1214, an Authentication Center (AuC) 1218, and an Equipment Identity Register (EIR) 1216. The MSC 1208 performs a switching function for the network. The MSC also performs other functions, such as registration, authentication, location updating, handovers, and call routing. The GMSC 1210 provides a gateway between the GSM network and other networks, such as an Integrated Services Digital Network (ISDN) or Public Switched Telephone Networks (PSTNs) 1220. In other words, the GMSC 1210 provides interworking functionality with external networks.

The HLR 1212 is a database or component(s) that comprises administrative information regarding each subscriber registered in a corresponding GSM network. The HLR 1212 also includes the current location of each MS. The VLR 1214 is a database or component(s) that contains selected administrative information from the HLR 1212. The VLR contains information necessary for call control and provision of subscribed services for each MS currently located in a geographical area controlled by the VLR. The HLR 1212 and the VLR 1214, together with the MSC 1208, provide the call routing and roaming capabilities of GSM. The AuC 1216 provides the parameters needed for authentication and encryption functions. Such parameters allow verification of a subscriber's identity. The EIR 1218 stores security-sensitive information about the mobile equipment.

A Short Message Service Center (SMSC) 1209 allows one-to-one Short Message Service (SMS) messages to be sent to/from the MS 1202. A Push Proxy Gateway (PPG) 1211 is used to "push" (e.g., send without a synchronous request) content to the MS 1202. The PPG 1211 acts as a proxy between wired and wireless networks to facilitate pushing of data to the MS 1202. A Short Message Peer to Peer (SMPP) protocol router 1213 is provided to convert SMS-based SMPP messages to cell broadcast messages. SMPP is a protocol for exchanging SMS messages between SMS peer entities such as short message service centers. It is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 1202 sends a location update including its current location information to the MSC/VLR, via the BTS 1204 and the BSC 1206. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 1230 is logically implemented on the GSM core network architecture by introducing two packet-switching network nodes, a serving GPRS support node (SGSN) 1232, a cell broadcast and a Gateway GPRS support node (GGSN) 1234. The SGSN 1232 is at the same hierarchical level as the MSC 1208 in the GSM network. The SGSN controls the connection between the GPRS network and the MS 1202. The SGSN also keeps track of individual MS's locations and security functions and access controls.

A Cell Broadcast Center (CBC) 1233 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 1234 provides a gateway between the GPRS network and a public packet network (PDN) or other IP networks 1236. That is, the GGSN provides interworking functionality with external networks, and sets up a logical link to the MS through the SGSN. When packet-switched data leaves the GPRS network, it is transferred to an external TCP-IP network 1236, such as an X.25 network or the Internet. In order to access GPRS services, the MS first attaches itself to the GPRS network by performing an attach procedure. The MS then activates a packet data protocol (PDP) context, thus activating a packet communication session between the MS. the SGSN, arc the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time. A class B MS can attach to the network for both GPRS services and GSM services simultaneously. However, a class B MS does not support simultaneous operation of the GPRS services and GSM services. That is, a class B MS can only use one of the two services at a given time. A class C MS can attach for only one of the GPRS services and GSM services at a time. Simultaneous attachment and operation of GPRS services and GSM services is not possible with a class C MS.

A GPRS network 1230 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not received pages from a circuit switched domain when engaged in a data call, since the MS is receiving data and is not listening to a paging channel In a NOM3 network, a MS can monitor pages for a circuit switched network while received data and vise versa.

The IP multimedia network 1238 was introduced with 3GPP Release 5, and includes an IP multimedia subsystem (IMS) 1240 to provide rich multimedia services to end users. A representative set of the network entities within the IMS 1240 are a call/session control function (CSCF), a media gateway control function (MGCF) 1246, a media gateway (MGW) 1248, and a master subscriber database, called a home subscriber server (HSS) 1250. The HSS 1250 may be common to the GSM network 1201, the GPRS network 1230 as well as the IP multimedia network 1238.

The IP multimedia system 1240 is built around the call/session control function, of which there are three types: an interrogating CSCF (I-CSCF) 1243, a proxy CSCF (P-CSCF) 1242, and a serving CSCF (S-CSCF) 1244. The P-CSCF 1242 is the MS's first point of contact with the IMS 1240. The P-CSCF 1242 forwards session initiation protocol (SIP) messages received from the MS to an SIP server in a home network (and vice versa) of the MS. The P-CSCF 1242 may also modify an outgoing request according to a set of rules defined by the network operator (for example, address analysis and potential modification).

The I-CSCF 1243 forms an entrance to a home network and hides the inner topology of the home network from other networks and provides flexibility for selecting an S-CSCF. The I-CSCF 1243 may contact a subscriber location function (SLF) 1245 to determine which HSS 1250 to use for the particular subscriber, if multiple HSS's 1250 are present. The S-CSCF 1244 performs the session control services for the MS 1202. This includes routing originating sessions to external networks and routing terminating sessions to visited networks. The S-CSCF 1244 also decides whether an application server (AS) 1252 is required to receive information on an incoming SIP session request to ensure appropriate service handling. This decision is based on information received from the HSS 1250 (or other sources, such as an application server 1252). The AS 1252 also communicates to a location server 1256 (e.g., a Gateway Mobile Location Center (GMLC)) that provides a position (e.g., latitude/longitude coordinates) of the MS 1202.

The HSS 1250 contains a subscriber profile and keeps track of which core network node is currently handling the subscriber. It also supports subscriber authentication and authorization functions (AAA). In networks with more than one HSS 1250, a subscriber location function provides information on the HSS 1250 that contains the profile of a given subscriber.

The MGCF 1246 provides interworking functionality between SIP session control signaling from the IMS 1240 and ISUP/BICC call control signaling from the external GSTN networks (not shown). It also controls the media gateway (MGW) 1248 that provides user-plane interworking functionality (e.g., converting between AMR- and PCM-coded voice). The MGW 1248 also communicates with other IP multimedia networks 1254.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of such matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a receiver that receives a mobile application part message from an enterprise network, the mobile application part message comprising an originating point code, a mobile application part type, and an international mobile subscriber identity value;
a memory that stores computer-executable components, the computer-executable components comprising:
an analysis component that:
accesses a provisioning database according to the originating point code and retrieves a dual mode services agreement between an enterprise associated with the originating point code and a home public land mobile network, and
analyzes the dual mode services agreement according to the international mobile subscriber identity value and the mobile application part type and verifies that a subscriber associated with the international mobile subscriber identity value is authorized to conduct a transaction based on the mobile application part type; and
a processor that facilitates execution of at least one of the computer-executable components.

2. The system of claim 1, wherein the mobile application part message is part of a message formatted in accordance with a Signaling System 7 message format.

3. The system of claim 1, wherein the mobile application part type is a location update.

4. The system of claim 1, further comprising a signal transfer point that comprises the analysis component.

5. The system of claim 1, wherein the mobile application part type is a transaction that sends routing information.

6. The system of claim 1, wherein the mobile application part type is a subscriber location report.

7. The system of claim 1, further comprising a home location register that comprises the analysis component.

8. The system of claim 1, further comprising a visitor location register that comprises the analysis component.

9. The system of claim 1, further comprising a mobile switching center that comprises the analysis component.

10. The system of claim 1, wherein the analysis component updates the provisioning database according to a change with regard to access rights associated with the enterprise.

11. The system of claim 1, further comprising a billing component that logs charges incurred by the enterprises and subscribers.

12. The system of claim 1, further comprising a billing component that automatically charges the enterprise for charges incurred by the enterprise.

13. The system of claim 12, wherein the billing component charges fees based on the type of mobility management transaction associated with the request.

14. The system of claim 1, further comprising a notification component that provides the enterprise with a notification that the mobility management transaction is rejected.

15. The system of claim 1, further comprising:
a counter component that counts a number of undertaken mobility management transactions; and
a notification component that notifies the enterprise network in response to a count determined by the counter component reaching a threshold.

16. The system of claim 1, further comprising a relaying component that relays the request to a home location register.

17. The system of claim 16, further comprising a signal transfer point that comprises the relaying component.

18. A method, comprising:
employing a processor to execute computer readable instructions stored in a computer readable storage medium, the instructions comprising:
receiving a mobile application part message, comprising an originating point code, a mobile application part type, and an international mobile subscriber identity value;
accessing a provisioning database according to the originating point code and retrieving a dual mode services agreement between an enterprise associated with the originating point code and a home public land mobile network; and
analyzing the dual mode services agreement according to the international mobile subscriber identity value and the mobile application part type and verifying that a subscriber associated with the international mobile subscriber identity value is authorized to conduct a transaction based on the mobile application part type.

19. The method of claim 18, wherein the mobile application part message is in a signaling system 7 format.

20. The method of claim 18, wherein the mobile application part type is a location update message.

21. A signal transfer point apparatus, comprising:
a receiver that receives a mobile application part message, comprising an originating point code, a mobile application part type, and an international mobile subscriber identity value; and
a memory that stores computer-executable components, the computer-executable components comprising:
an analysis component that:
accesses a provisioning database according to the originating point code and retrieves a dual mode services agreement between an enterprise associated with the originating point code and a home public land mobile network, and
analyzes the dual mode services agreement according to the international mobile subscriber identity value and the mobile application part type and checks that the subscriber associated with the international mobile subscriber value is authorized to conduct a transaction based on the mobile application part type.

22. The signal transfer point apparatus of claim 21, wherein the mobile application part transaction is a transaction that sends routing information.

23. The signal transfer point apparatus of claim 21, wherein the mobile application part message is in a signaling system 7 message format.

24. The signal transfer point apparatus of claim 21, wherein the mobile application part transaction type is a subscriber location report.

25. The signal transfer point apparatus of claim 21, wherein the mobile application part transaction type is a location update.

* * * * *